US012683758B2

(12) United States Patent
Connor et al.

(10) Patent No.: US 12,683,758 B2
(45) Date of Patent: Jul. 14, 2026

(54) SIDE-CHANNEL LEAKAGE ENGINE

(71) Applicant: NXP B.V., Eindhoven (NL)

(72) Inventors: Jack Connor, Biggar (GB); Nikita Veshchikov, Brussels (BE); Melissa Azouaoui, Norderstedt (DE)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 18/810,914

(22) Filed: Aug. 21, 2024

(65) Prior Publication Data

US 2026/0058790 A1     Feb. 26, 2026

(51) Int. Cl.
H04L 9/00          (2022.01)
G06F 21/75         (2013.01)

(52) U.S. Cl.
CPC .............. H04L 9/002 (2013.01); G06F 21/75 (2013.01)

(58) Field of Classification Search
CPC ................................. H04L 9/002; G06F 21/75
See application file for complete search history.

(56) References Cited

U.S. PATENT DOCUMENTS

| | | | |
|---|---|---|---|
| 10,430,565 B2 | 10/2019 | Moritz et al. | |
| 10,567,155 B2 | 2/2020 | Medwed et al. | |
| 11,163,857 B2 | 11/2021 | Moritz et al. | |
| 11,403,101 B1 | 8/2022 | Sugumar | |
| 11,520,960 B1 * | 12/2022 | Selvakumaran | .... G06F 30/3308 |
| 11,762,993 B2 | 9/2023 | Schat | |
| 2006/0036833 A1 | 2/2006 | Piry et al. | |
| 2024/0235808 A1 | 7/2024 | Connor et al. | |

FOREIGN PATENT DOCUMENTS

| | | | |
|---|---|---|---|
| DE | 102014009808 A1 | 1/2016 | |
| EP | 2587402 A1 | 5/2013 | |
| EP | 4307155 A1 | 1/2024 | |

* cited by examiner

*Primary Examiner* — Beemnet W Dada

(57)          ABSTRACT

A method of operation for a side-channel leakage engine includes initializing a plurality of copy registers with a respective initial value. A respective copied value is copied from a leakage value circuit to at least one of the copy registers, wherein the leakage value circuit comprises a data register comprising a leakage value and each of the copy registers comprises a respective plurality of bits comprising a same number of bits as the data register. An observable characteristic of the side-channel leakage engine is generated, wherein the observable characteristic is proportional to a number of bit transitions of the respective plurality of bits of each of the copy registers, transitioning from the respective initial value to the respective copied value.

20 Claims, 8 Drawing Sheets

Unprotected

120

122
Input

124
Crypto Algorithm

Protected With Noise Generation

130

122
Input

124
Crypto Algorithm

132
Simple Noise Generator

Protected With Biased Noise Using Leakage Engine

140

142
Secret Key

146
Config

122
Input

124
Crypto Algorithm

144
Leakage Engine

Protected With Biased Noise Using Fake Key

150

142
Secret Key

154
Fake Secret Key

122
Input

124
Crypto Algorithm

152
Crypto Algorithm

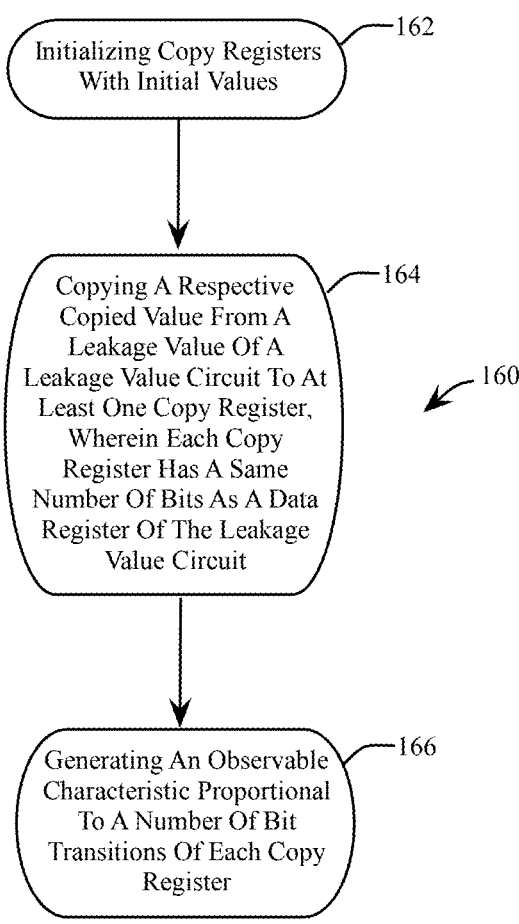

Initializing Copy Registers With Initial Values —162

Copying A Respective Copied Value From A Leakage Value Of A Leakage Value Circuit To At Least One Copy Register, Wherein Each Copy Register Has A Same Number Of Bits As A Data Register Of The Leakage Value Circuit —164

160

Generating An Observable Characteristic Proportional To A Number Of Bit Transitions Of Each Copy Register —166

FIG. 10

SIDE-CHANNEL LEAKAGE ENGINE

FIELD

This disclosure relates generally to the security of electronic systems, and more specifically to protecting sensitive system information from side channel attacks.

BACKGROUND

Modern Information Technology (IT) security systems often rely upon the use of cryptography. One of the main building blocks of cryptography is encryption. The security of encryption algorithms may rely upon the secrecy of a special value called a key. With a good encryption scheme it should be impossible to decrypt a secret message without the knowledge of the necessary secret key.

Many attacks on encryption systems may try to extract the secret key from the device that is encrypting or decrypting data. One of the strongest types of attacks against cryptographic devices is called a Side-Channel Attack (SCA). Side-channel attacks try to break the implementation of a cryptographic algorithm. Specifically, a SCA tries to extract the secret key from a device that encrypts, (or decrypts), data. SCA use physical properties of devices to extract keys, such as by probing current draw or voltage fluctuations at a devices power rails, by monitoring electromagnetic radiation emitted from a device during operation, or by monitoring other physical properties or changes during operation.

Countermeasures against side-channel attacks typically try to remove the dependence between the power consumption of the device and the data being processed, commonly done by splitting sensitive data into shares (masking), or by randomizing the power consumption of each clock cycle (hiding).

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 10 is a flowchart representation of a method of operation for a side-channel leakage engine, in accordance with an embodiment of the present disclosure.

DETAILED DESCRIPTION

Figure 1:
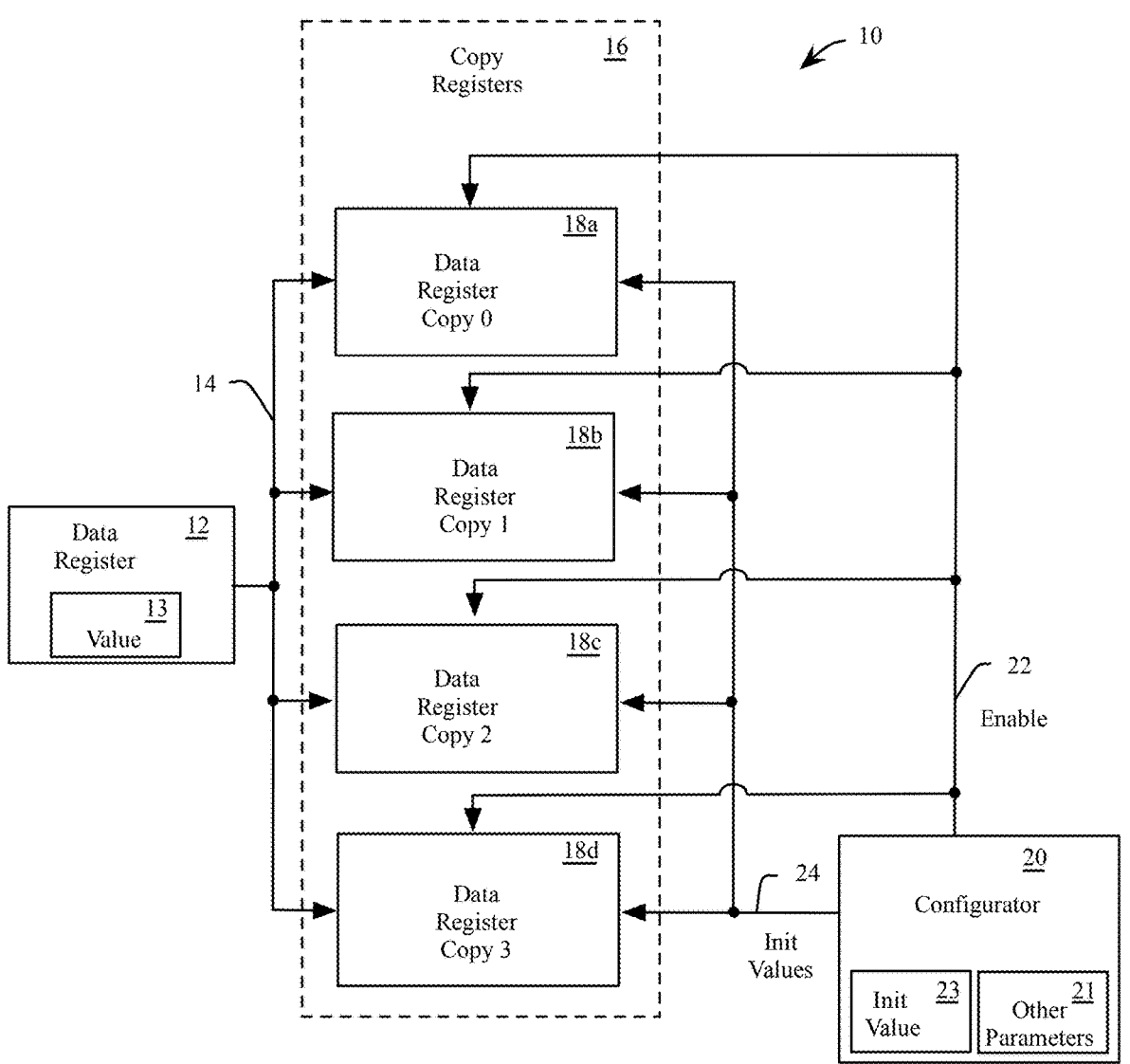
FIG. 1 is a schematic view of a leakage engine circuit with a four times leakage multiplication, in accordance with an embodiment of the present disclosure.

Embodiments described herein provide for the intentional leakage of non-sensitive data to obscure or confuse an attacker from successfully performing an SCA from the leakage data of a sensitive value (e.g., a "key" used for encryption or decryption). Leakage may occur from changes of the state of a bus or memory element, leading to a spike in current consumption. By creating a strong dependence between intentionally leaked data and power consumption (e.g., side-channel leakage), leaked at certain times, interference may be created with the statistical methods used by an attacker.

By intentionally creating side-channel leakage having proportionally weighted power consumption, an amplified leakage signature, variable leakage strength, variable leakage patterns, faked information, and so on, the side-channel leakage cannot be readily interpreted by an attacker, without the attacker knowing the proportion of the power consumption that is attributable to the signal engine. In a real scenario, the real proportion would be highly variable from setup to setup, and very difficult to guess. For example, an attacker may attempt an attack on a SubBytes intermediate of the Advanced Encryption Standard (AES) 128 to retrieve a secret key. The attacker may perform an attack on a target device, which encrypts plaintext data with a secret fixed key. A stronger leakage signature may be intentionally generated with a (publicly known) plaintext byte by replicating the leakage incurred by the register transfer of the plaintext data with a number of identical registers. Leaking public information (e.g., plaintext) in this example, works well due to the bijection between the public data and the attackers target (e.g., SubBytes). Thus this example actively interferes with the attack as the plaintext leakage will masquerade as key leakage for all key candidates and overpower any real key related leakage. Further countermeasures to the attack may be used by varying the leakage strength, leaking patterns that resemble leakage functions often used in side-channel analysis, altering the leakage pattern based on the leakage data, device characteristics, randomness and other factors.

Throughout this disclosure, embodiments demonstrate the use of intentional leakage to thwart an SCA based on power consumption. However, the embodiments may be adapted to prevent an SCA based on other observable characteristics, including without limit, Electro-Magnetic (EM) radiation, sound produced by the device, and timing alterations (e.g., the time that the device takes to encrypt data). In various embodiments, the use of "copy" registers may also be referred to as a "leakage multiplication" register. Leakage based on the intentional transfer of non-secret data may also be referred to as "biased noise." Intentional leakage may be generated contemporaneously with a transfer of a sensitive value. As used herein, the term contemporaneous may refer to leakage generated with substantial temporal overlap with transfer of a sensitive value, or within close proximity in time, to fall within the time window used by an attacker for an SCA analysis. Furthermore, the teachings of this disclosure may be adapted to various cryptographic algorithms, encryption, decryption, digital signature generation, computation of a Message Authentication Code (MAC), authenticated encryption, symmetric cryptographic algorithms, public-key cryptographic algorithms and the like.

FIG. 1 shows an embodiment 10 of a leakage engine circuit configured to multiply a leakage value by a factor of four. The embodiment 10 includes a data register 12, which may transfer a leakage value 13, to a number of copy registers 16 via a net 14. The embodiment 10 includes data copy registers 18a, 18b, 18c and 18d (generally 18). A configurator 20 may include an initial value 23 as well as other parameters 21. The configurator 20 may enable one or more of the data copy registers 18 with respective enable signals on a net 22. The term "net" as used herein means a conductive trace or connection that communicatively couples at least two elements. The configurator 20 may also initialize one or more of the data copy registers 18 with respective initial values 23 via a net 24. In one embodiment, the data register 12 may receive a data value to be leaked. In another embodiment, the data register 12 may be part of a CPU or cryptographic engine. In one or more embodiments, the data copy registers 18 are first initialized to initial values 23, which may be different than the last respective state of each data copy register 18 or, in another embodiment, the respective states of the data copy registers 18 may remain the same. In another embodiment, the number of data copy registers 18 may be different than four, depending upon the strength of leakage that is desired.

The strength of leakage may also be altered by the number of data copy registers 18 that are enabled by the configurator 20. In one embodiment, each of the data copy registers 18 have a same number of data bits as the data register 12. When the leakage value 13 is transferred from the data register 12 to each of the data copy registers 18, a small amount of leakage occurs from each enabled data copy register 18 proportional to the number of bits within each data copy register 18 that transition between states. Thus, the number of transitions depends upon the leakage value 13 as well as the respective initial state of each data copy register 18. The configurator 20 may be used to modify a leakage function (e.g., a relationship between the leakage value 13 and the amount of consumed energy) of a side-channel leakage engine comprising the embodiment 10. By default, an initial value of each data copy register 18 is zero. Thus, when the leakage value 13 is copied into each data copy register 18, the amount of energy consumed by the copying action may be proportional to the number of bits of the leakage value 13 that are equal to one. The number of bits that are equal to one may be referred to as a "Hamming Weight". By changing the initial values of one or more of the data copy registers 18, more complex leakage functions are obtained. In another embodiment, the initial values of the data copy registers 18 may be set to the last leakage value 13 copied from the data register 12 (e.g., the data copy registers 18 are not reset thus retaining the last transferred leakage value 13). In so doing, the embodiment 10 may implement a "Hamming Distance" leakage function. In one embodiment, each data copy register 18 may be initialized to a different initial state, based on a random selection of initial states, thereby producing a randomized Hamming Weight.

Figure 2:
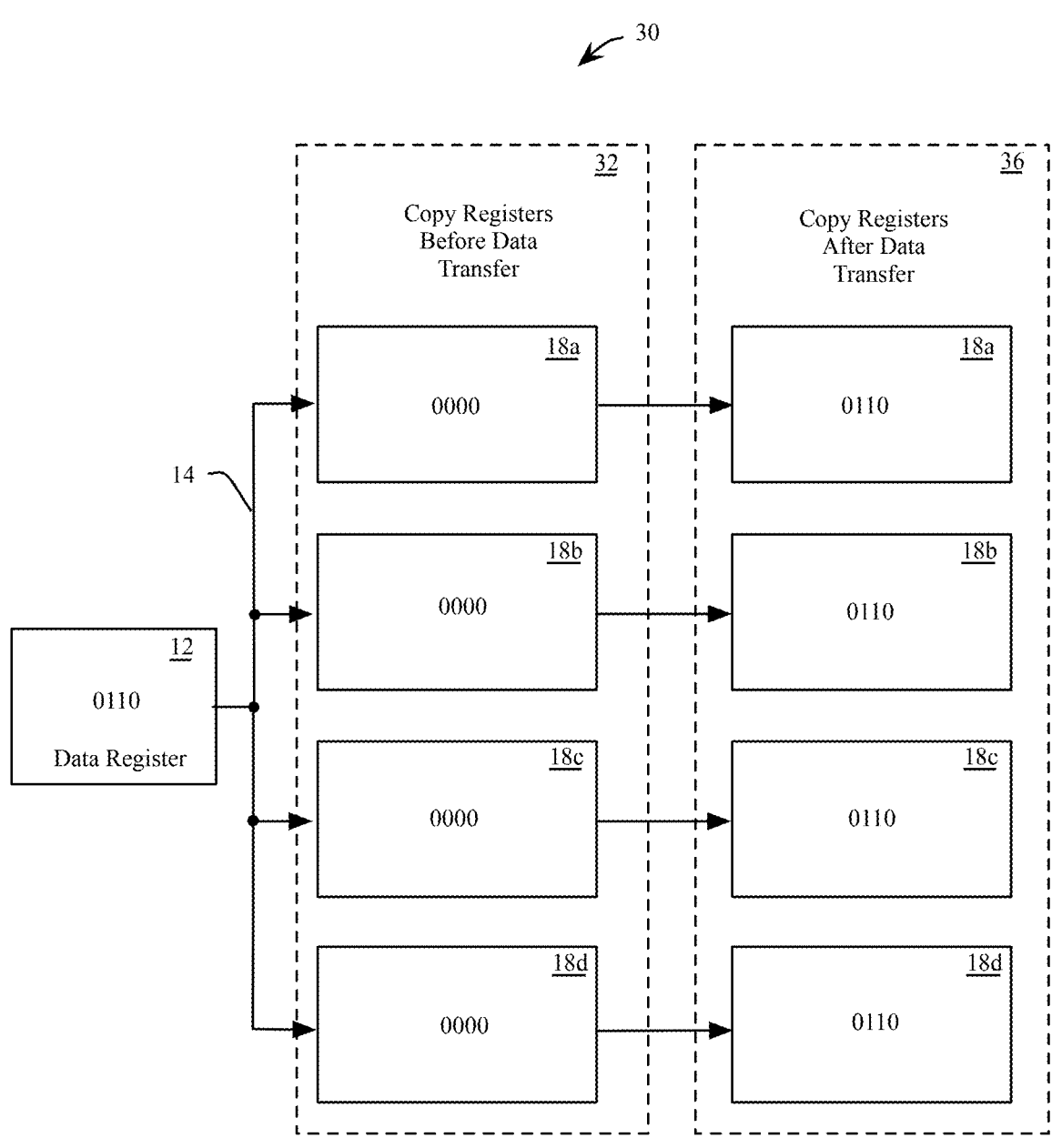
FIG. 2 is a flowchart representation of the leakage engine circuit of FIG. 1 showing data transfer, in accordance with an embodiment of the present disclosure.

FIG. 2 shows an embodiment 30 of the leakage engine circuit of FIG. 1 before and after a data transfer of the leakage value 13 from the data register 12 via the net 14. With continued reference to FIG. 1 and FIG. 2, a leakage value 13 of "0110" is received by the data register 12. Prior to transferring the leakage value 13 from the data register 12 to the data copy registers 18 at state 32, each of the data copy registers 18 are initialized to a zero value "0000", either by the configurator 20 in one embodiment, or by a reset operation (not shown) in another embodiment. After the leakage value 13 is transferred to the data copy registers 18 at state 36, each data copy register will change to the leakage value 13, thereby each generating two-bit transitions. Assuming each bit transition consumes "N" units of energy, the total power consumption of the embodiment 30 will be 8N units, thus providing more observable leakage from the point of view of the attacker, compared to a simple transfer of the leakage value 13 into the data register 12.

Figure 3:
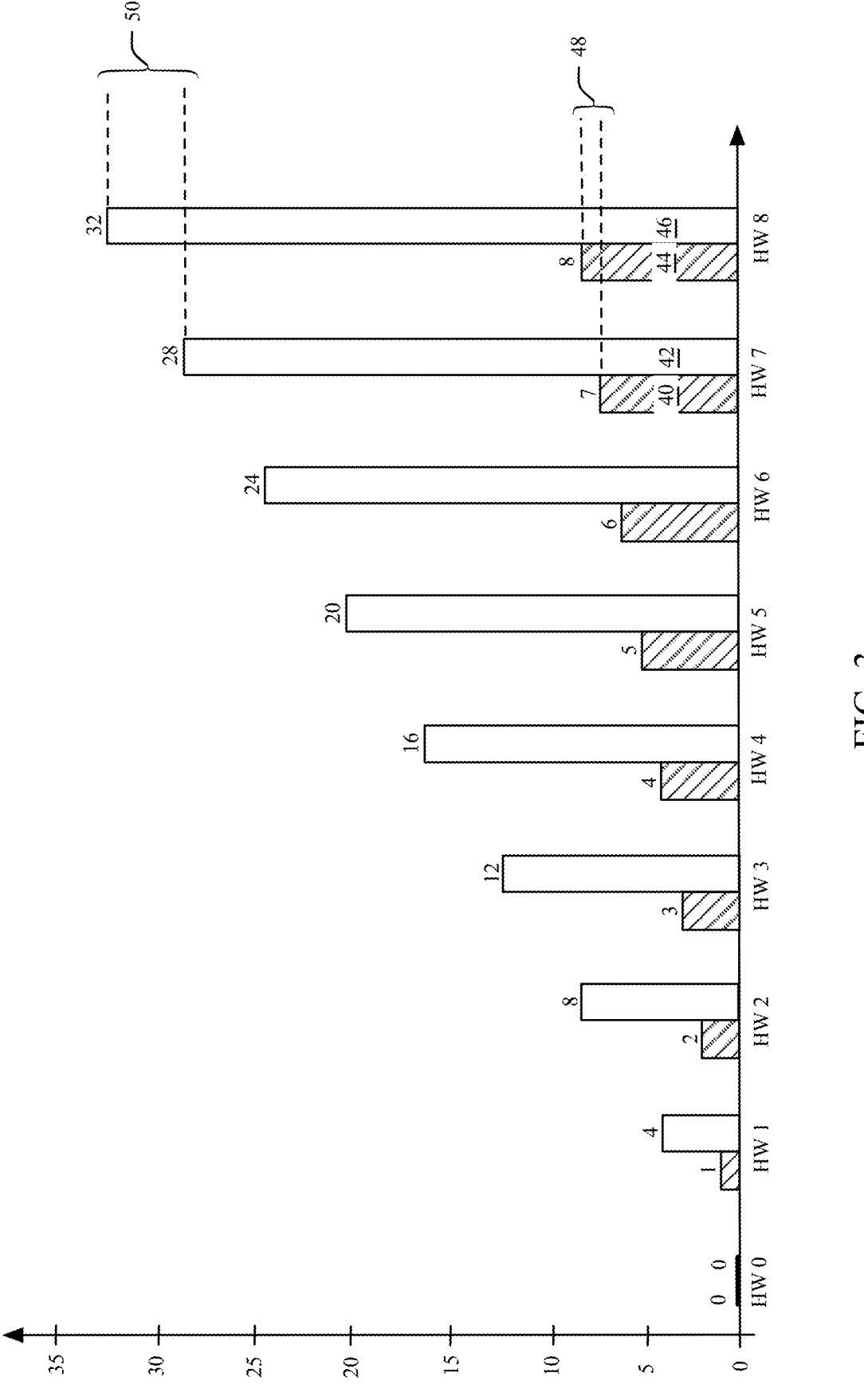
FIG. 3 is graphical view of the energy consumption of a typical data transfer without leakage multiplication compared to the energy consumption using the embodiment of the circuit of FIG. 1.

FIG. 3 shows a graphical view of the energy consumption without leakage multiplication compared to the energy consumption using the embodiment 10 of FIG. 1. In FIG. 3, various Hamming Weights (HW) are plotted against the total energy consumption of the data copy registers 18 of embodiment 10 with and without leakage multiplication. In the illustrated example, the HW are plotted for 8-bit transitions. Specifically, HW0, HW1, HW2, HW3, HW4, HW5, HW6, HW7 and HW8 corresponds to 0, 1, 2, 3, 4, 5, 6, 7 and 8-bit transitions respectively. For the HW7, the energy consumption 40 consumes 7 (N) units of energy for a single register transfer without the leakage multiplication provided by the four data copy registers 18 of FIG. 1. In contrast, the energy consumption 42 consumes 28 (N) units of energy, providing a significant energy difference 48 (e.g., a difference of 28-7 N units). Similarly, For the HW8, the energy consumption 44 consumes 8 (N) units of energy for a single register transfer without the leakage multiplication provided by the four data copy registers 18 of FIG. 1. In contrast, the energy consumption 46 consumes 32 (N) units of energy, providing a significant energy difference 50 (e.g., a difference of 32-28 N units). Thus, the increased energy consumption from the leakage multiplication of the embodiment 10 of FIG. 1 provides a more "visible" signature compared to leakage incurred by sensitive data transitions in related circuits (e.g., the transfer of a secret key).

For the attacker performing SCA it is important to distinguish values that are being leaked. This exercise may happen in the presence of noise which makes distinguishing leaked values more difficult. Furthermore, the energy consumption that the attacker is seeking to distinguish is the consumption spent specifically on the transfer of data between a pair of registers, not the consumption of the entire device itself (e.g., a CPU or cryptographic engine). Different devices may use also different randomized configurations. For example, different devices can use different initial values for each of the data copy registers 18. This will make transferability of attacks between devices much more difficult.

Figure 4:
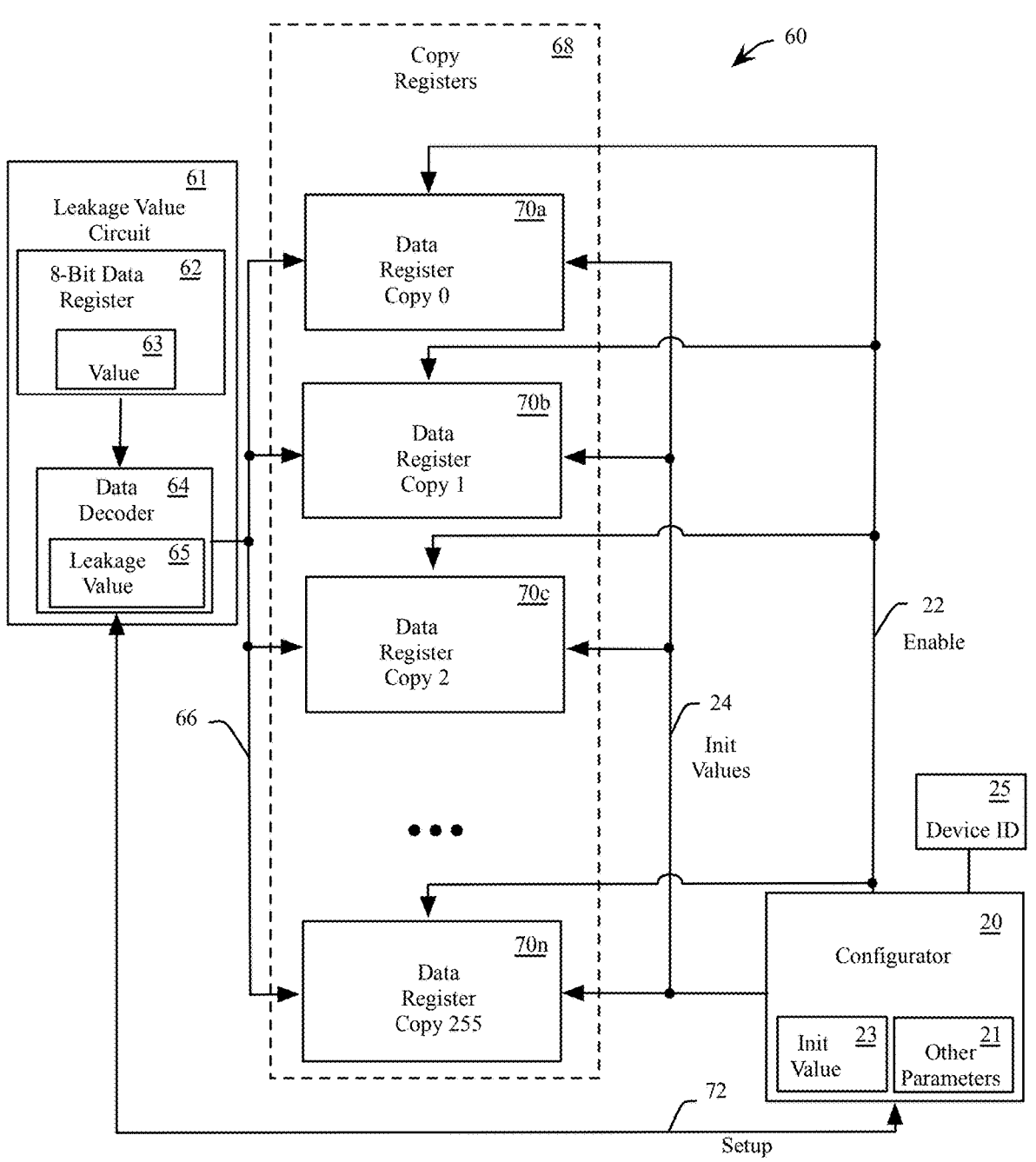
FIG. 4 is a schematic view of a leakage engine circuit including an 8-bit register with a decoder, in accordance with an embodiment of the present disclosure.

FIG. 4 shows an embodiment 60 of a leakage engine circuit configured to multiply a leakage value by a factor of 256. The embodiment 60 includes a leakage value circuit 61 comprising a data register 62 coupled to a data decoder 64. In one embodiment, the data register 62 may receive a data value to be leaked. In another embodiment, the data register 62 may be part of a CPU or cryptographic engine. The data decoder 64 may modify the data value 63 in the 8-bit data register 62 to generate a leakage value 65. Similar to the embodiment 10 of FIG. 1, the leakage value 65 may be transferred to a number of copy registers 68, including data copy registers 70a, 70b, 70c, through 70n (generally 70). In one or more embodiments, the data register 62 (and corresponding data copy registers 70) may be 8-bit registers. In one or more embodiments, the data registers 62 and copy registers may have a different number of bits.

The configurator 20 may enable one or more of the data copy registers 70 with respective enable signals 22. The configurator 20 may also initialize one or more of the data copy registers 70 with one or more respective initial values 23 via a net 24. In one or more embodiments, the configurator 20 may receive a device identification (ID) 25 of device comprising the leakage engine 60. In one or more embodiments, the ID 25 may be stored in a ROM or programmable register of the device. The configurator 20 may modify the setup of the data decoder 64 in dependence on a value of the ID 25 to alter the decoding of the value 63 specific to the ID 25, thereby frustrating attempts by an attacker to reuse profiling data that an attacker may obtain for one device and attempt to apply to another device. In one or more embodiments, the decoder 64 may decode the leakage value 65 and thereby instruct the configurator 20 to generate respective initial values of the copy registers based on the leakage value 65.

In one or more embodiments, the data copy registers 70 are first initialized to initial values 23, which may be different than the last respective states of each data copy register 70. In one or more embodiments, the configurator 20 may selectively initialize selected data copy registers 70 of the plurality of data copy registers 70 with the initial value 23 and may leave others of the plurality of data copy registers 70 in their current states. One or more embodiments, the configurator 20 may not initialize the plurality of data copy registers 70. In one or more embodiments, the number of data copy registers 70 may be different than four, depending upon the strength of leakage that is desired. In the illustrated embodiment, the embodiment 60 of the leakage engine circuit may include any number N of data copy registers 70.

In the illustrated embodiment 60 of the leakage engine circuit, the configurator 20 may be communicatively coupled to the data decoder 64 by a control line 72. The configurator 20 may be configured to communicate a setup signal to the data decoder 64 via the control line 72. The setup signal may include data that can be used by the data decoder 64 to define the leakage value based on at least the value 63 stored in the 8-bit data register 62.

In one or more embodiments, the configurator 20 may communicate the setup signal to the data decoder 64 to configure the data decoder 64 to write different leakage values into one or more of the data copy registers 70, depending on the data value 63 stored in the 8-bit data register 62. A function that the configurator 20 uses to produce the setup signal to configure the data decoder 64 defines a "leakage function" and can be set to various functions that are often used by SCA analysis, thereby increasing the probability that the SCA will observe an "intentionally leaked" leakage value rather than a data transfer of a secret value.

In one or more embodiments, the leakage function may be an "identify function". For example, if a desired leakage value is 75 and each one-bit data copy register is initialized to zero, then the data decoder 64 would copy a one value to any combination of 75 data copy registers 70 and copy a zero value to the remainder, thereby ensuring 75-bit transitions. In one or more embodiments, each copy register 70 may be a 4-bit register and the 8-bit data register 62 contains the value 63 having a value of 149, then the data decoder 64 may set 149 data copy registers 70 to a value "1111" and the remaining data copy registers 70 to a value "0000".

In one or more embodiments, the decoding function may be different between different devices, as distinguished by a device identification (ID). In this embodiment, even if the attacker could create a successful mode for an SCA for one device, the model may not work on the target device with a different ID. In another embodiment, the configurator 20 may use some randomness to alter the leakage function. In one embodiment, the data decoder 64 may select one of the data copy registers 70 to receive a random value. In one or more embodiments, the configurator 20 may copy a respective copied value from the leakage value circuit 61 contemporaneously with a transfer of a sensitive value from another apparatus, by instructing the data decoder 64 to initiate the copy based on the other parameters 21 of the configurator 20, wherein the other parameters 21 include timing information related to the transfer of the sensitive value.

Figure 5:
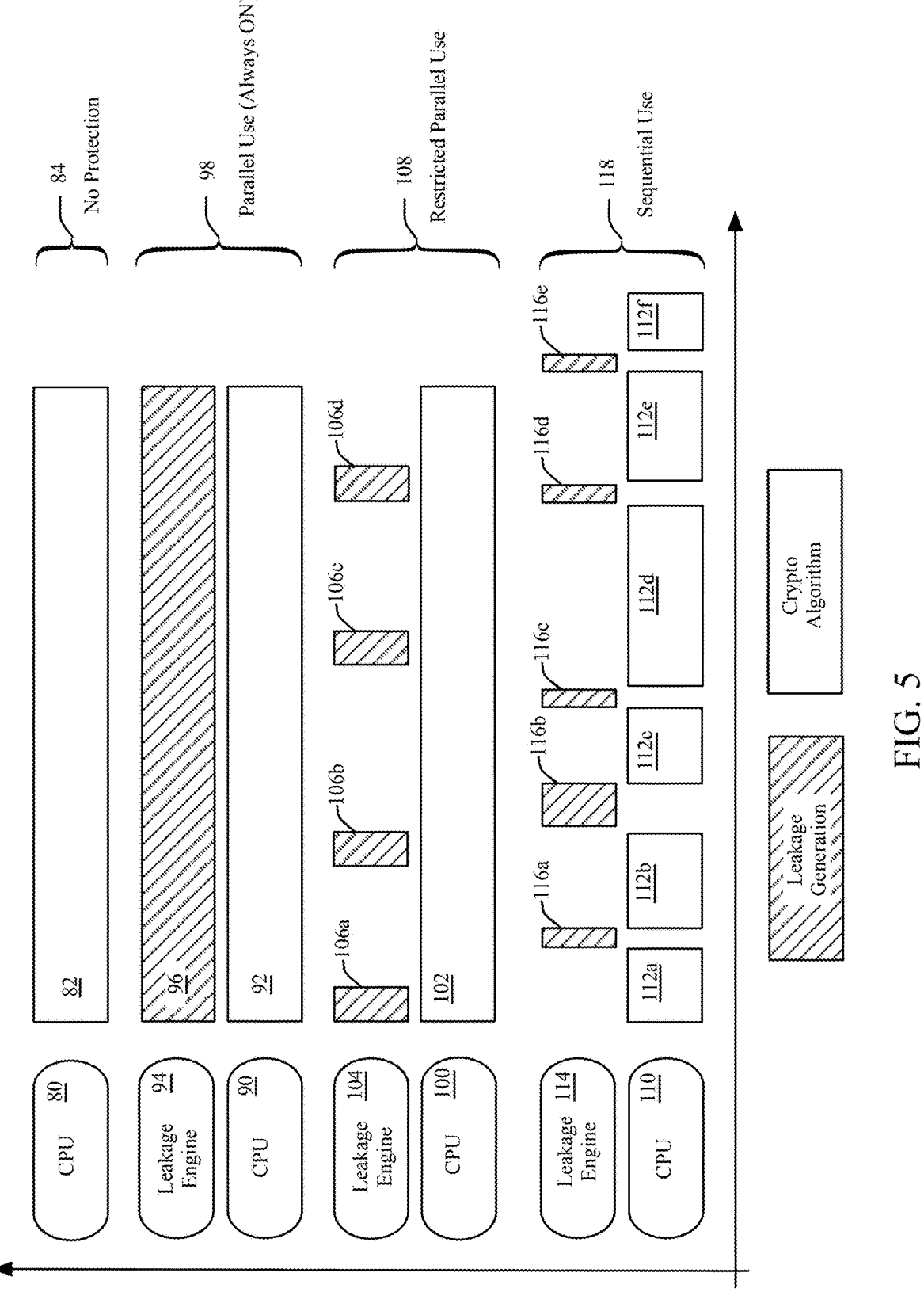
FIG. 5 is a graphical view of several methods of using a leakage engine with a Central Processing Unit (CPU), in accordance with an embodiment of the present disclosure.

FIG. 5 shows four embodiments of methods of using a leakage engine (e.g., embodiment 10 or 60) with a CPU. A CPU 80 may execute a cryptographic (otherwise known as "crypto") algorithm 82 with no SCA protection 84. A CPU 90 may execute a cryptographic algorithm 92 in parallel with a leakage engine 94 continuously generating an intentional leakage 96 as a parallel use method 98. A CPU 100 may execute a cryptographic algorithm 102 in parallel with a leakage engine 104 with restricted generation of an intentional leakage 106a, 106b, 106c and 106d (generally 106) as a restricted parallel use method 108. In the method 108, the intentional leakage 106 may be generated to be contemporaneous with a transfer of a sensitive value within the CPU 100.

A CPU 110 may execute a series of cryptographic algorithms 112a, 112b, 112c, 112d, 112e and 112f (generally 112) sequentially interleaved with a leakage engine 114 generating a respective intentional leakage 116a, 116b, 116c, 116d and 116e (generally 116) as a sequential use method 118. In one embodiment, a continuous cryptographic algorithm is segmented into shorter algorithmic sections (e.g., 112a representing one section, 112b representing the next sequential section, and so on). Thus the complete cryptographic algorithm is effectively interrupted at various times, followed by leakage generation during the interruption, then allowed to continue to the next sequential section.

Figures 6, 7, 8, 9:
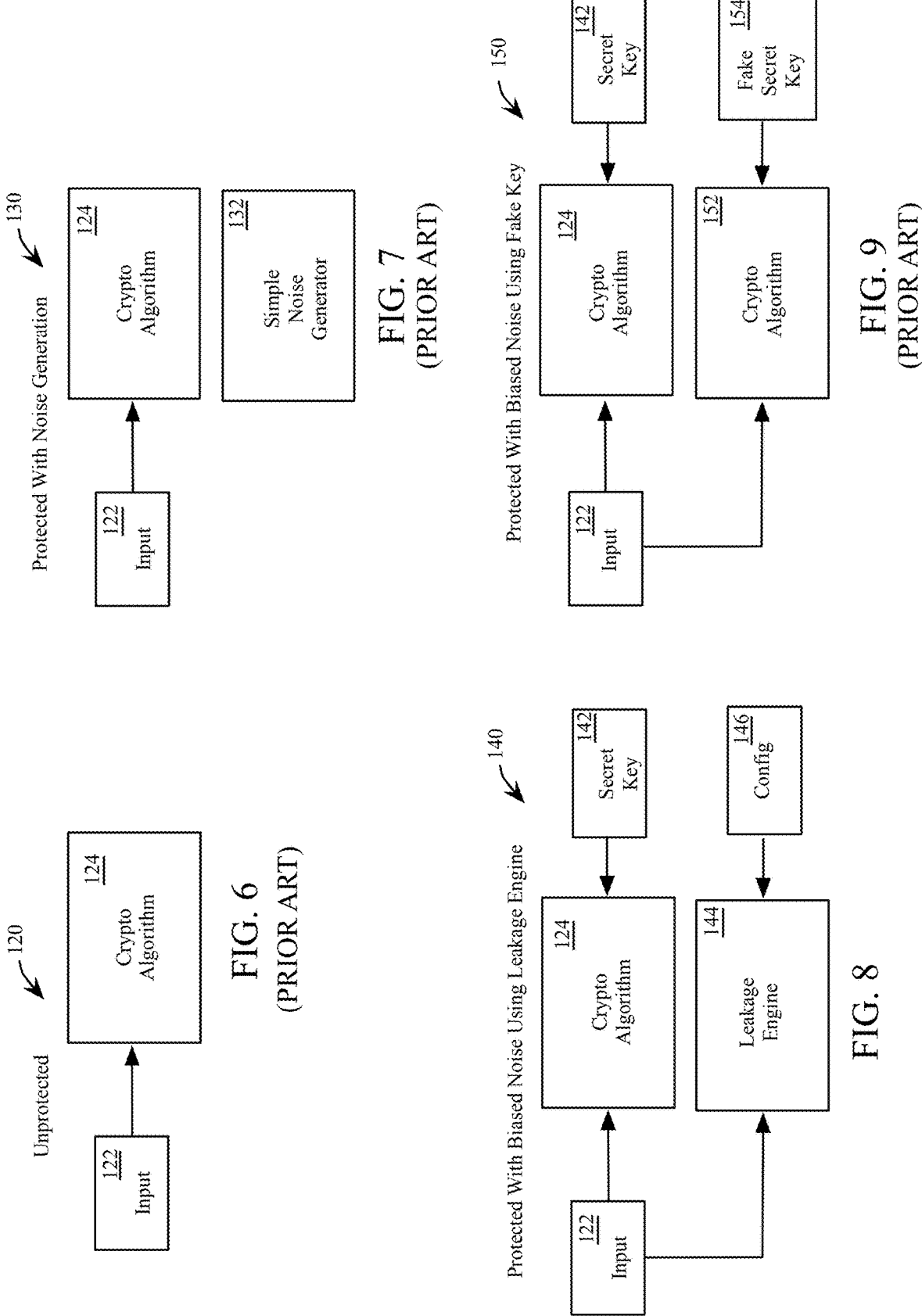
FIG. 6 is a schematic view of an example of a system without the protection of a leakage engine.
FIG. 7 is a schematic view of an example of a system protected by a simple noise generator.
FIG. 8 is a schematic view of a system protected by a leakage engine, in accordance with an embodiment of the present disclosure.
FIG. 9 is a schematic view of an example of a system protected by redundant cryptography algorithms and a fake key.

FIG. 6, FIG. 7, FIG. 8 and FIG. 9 show various system level configurations of a cryptographic engine executing a cryptographic algorithm. In FIG. 6, an example 120 shows a sensitive data input 122 being transferred to a cryptographic algorithm 124 without SCA protection. In FIG. 7, an example 130 shows a simple noise generator 132 being used to obscure a cryptographic algorithm 124. In FIG. 8, an embodiment 140 uses a secret key 142 with the cryptographic algorithm 124, the transfer of which is protected by a leakage engine 144 configured by a configurator 146. In FIG. 9, the example 150 attempts to secure the secret key 142 by executing a paralleled cryptographic algorithm 152, which may further use a fake secret key 154. It should be understood that, in other embodiments, the leakage engine may protect more than just the transfer of a key. The secret key 142 in FIG. 8 is shown for ease of illustration but the protection offered by the leakage engine should not be considered limited thereto.

In FIG. 7, when random noise generation is used, the noise is uniform and can be filtered and removed (typically by collecting more power traces), hence offering poor protection against an SCA. In contrast, when using the biased noise generated by FIG. 8, getting more power traces would only make the intentionally generated leakage stand out even more, and thus hide the power signature of the sensitive value. In FIG. 9, using a fake secret key may be implemented in two ways. Either a random key is used each time or a fixed key is used per device (and optionally is changed from time to time). In the first case the noise is random each time and thus is equivalent to just having an unrelated simple noise generator. In the second case, the added noise is biased and an attacker can potentially be tricked by it to recover a fake key instead of the real one. Moreover, the approach used in FIG. 9 requires either twice the execution time (by time sharing the cryptographic engine) or twice the area. In addition in case of a parallel execution with a fake key, the bias in the noise may be fixed and be equal to the leakage of the real key because the same algorithm is used twice, (once with the real key and once with a fake one).

FIG. 10 shows an embodiment 160 of a method of operation for a side-channel leakage engine. With continued reference to FIG. 1 and FIG. 10, at 162 copy registers 18 are initialized with initial values 23. At 164, a value based on a leakage value 13 of a leakage value circuit is copied to at least one copy register 18, where each copy register 18 has a same data width as the leakage value circuit. At 166, an observable characteristic (e.g., power consumption) is generated in proportion to a number of bit transitions of each copy register 18.

Figure 11:
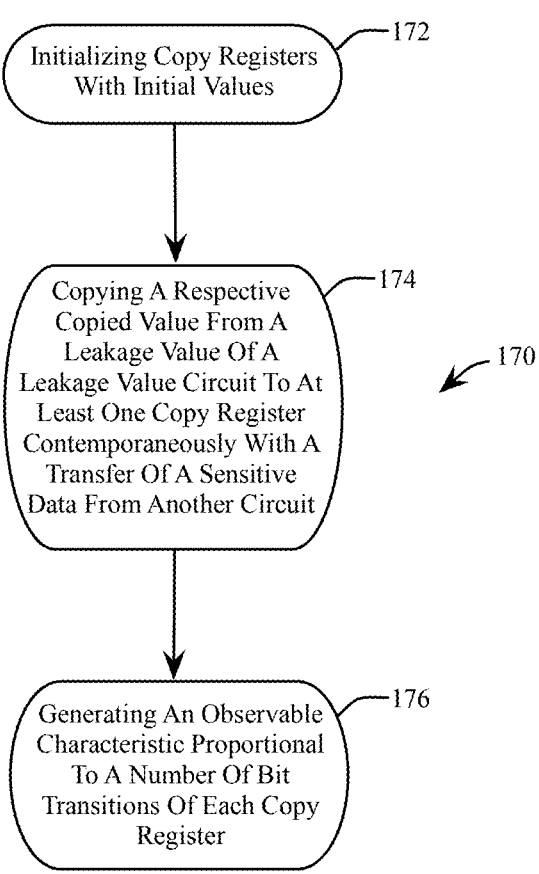
FIG. 11 is a flowchart representation of another method of operation for a side-channel leakage engine, in accordance with an embodiment of the present disclosure.

FIG. 11 shows an embodiment 170 of a method of operation for a side-channel leakage engine. With continued reference to FIG. 1 and FIG. 11, at 172 copy registers 18 are initialized with initial values 23. At 174, a respective copied value is copied from a leakage value 13 of a leakage value circuit (the data register 12 in one embodiment) to at least one copy register 18, contemporaneously with a transfer of a sensitive value (e.g., a secret key) from another circuit. At 176, an observable characteristic (e.g., power consumption) is generated in proportion to a number of bit transitions of each copy register 18. The methods described in FIG. 10 and FIG. 11 may be applicable to the embodiment 10 of FIG. 1 or the embodiment 60 of FIG. 4.

As will be appreciated, at least some of the embodiments as disclosed include at least the following. In one embodiment, a method of operation for a side-channel leakage engine comprises initializing a plurality of copy registers with a respective initial values. A respective copied value is copied from a leakage value circuit to at least one of the copy registers, wherein the leakage value circuit comprises a data register comprising a leakage value and each of the copy registers comprises a respective plurality of bits comprising a same number of bits as the data register. An observable characteristic of the side-channel leakage engine is generated, wherein the observable characteristic is proportional to a number of bit transitions of the respective plurality of bits of each of the copy registers, transitioning from the respective initial value to the respective copied value.

Alternative embodiments of the method of operation for a side-channel leakage engine include one of the following features, or any combination thereof. The observable characteristic comprises a power consumption. The leakage value is received at the data register as a plaintext value from a cryptographic engine. The bit transitions occur contemporaneously with a transfer of a sensitive value during an execution of a cryptographic algorithm. A subset of the plurality of copy registers is disabled to modify a leakage strength of the observable characteristic. At least one of the copy registers is initialized to a different initial value than at least one other of the copy registers. Initializing the plurality of copy registers comprises initializing with the respective initial values that equal the leakage value last copied from the leakage value circuit. The respective initial values are modified as a function of a device identification (ID) of a system comprising the side-channel leakage engine. In one or more embodiments, the device ID may be used as seed data by the configurator 20 to generate an initialization value. Initializing the plurality of copy registers comprises initializing at least one copy register with a random value. The leakage value is decoded with a decoder to generate the respective initial values of the plurality of copy registers, wherein the leakage value circuit comprises the decoder and the respective initial values define a leakage function.

In another embodiment, an apparatus comprises a leakage value circuit comprising a data register configured to receive a leakage value. Each of a plurality of copy registers comprise a respective plurality of bits, wherein each copy register comprises a same number of bits as the data register. A configurator is in communication with each copy register, the configurator is configured to initialize the plurality of copy registers with a respective initial value, and to copy a respective copied value from the leakage value circuit to at least one of the copy registers, wherein the plurality of copy registers is configured to generate an observable characteristic of a side-channel leakage engine, and the observable characteristic is proportional to a number of bit transitions of the respective plurality of bits of each of the copy registers, transitioning from the respective initial value to the respective copied value.

Alternative embodiments of the apparatus include one of the following features, or any combination thereof. The configurator is configured to enable each of the plurality of copy registers. The leakage value circuit comprises a decoder in communication with the data register, each of the plurality of copy registers and the configurator. The decoder is configured to decode the leakage value to generate the respective initial values of the plurality of copy registers, wherein the respective initial values define a leakage function. The configurator is configured to copy a respective copied value from the leakage value circuit contemporaneously with a transfer of a sensitive value from another apparatus.

In another embodiment, a method of operation for a side-channel leakage engine comprises initializing a plurality of copy registers with a respective initial value. A respective copied value is copied from a leakage value circuit to at least one of the copy registers contemporaneously with a transfer of a sensitive value from another circuit, wherein the leakage value circuit comprises a data register comprising a leakage value and each of the copy registers comprises a respective plurality of bits. An observable characteristic of the side-channel leakage engine is generated, wherein the observable characteristic is proportional to a number of bit transitions of the respective plurality of bits of each of the copy registers, transitioning from the respective initial value to the respective copied value.

Alternative embodiments of the method of operation for a side-channel leakage engine include one of the following features, or any combination thereof. The side-channel leakage engine repeatedly generates the observable characteristic unsynchronized to the transfer of the sensitive value. The side-channel leakage engine generates the observable characteristic during a time period proximal to the transfer of the sensitive value. The side-channel leakage engine generates the observable characteristic sequentially following an execution of an cryptographic algorithm. The transfer of the sensitive value is an execution step of a cryptographic algorithm.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operation for a side-channel leakage engine, the method comprising:

initializing a plurality of copy registers with a respective initial value;

copying a leakage value based on a stored value from a leakage value circuit to at least one of the plurality of copy registers, wherein the leakage value circuit comprises a data register comprising the stored value;

generating an observable characteristic of the side-channel leakage engine that is proportional to a number of bit transitions of one or more bits of each of the copy registers, the one or more bits transitioning from the respective initial value to the leakage value.

2. The method of claim 1 wherein the observable characteristic comprises a power consumption.

3. The method of claim 1 further comprising receiving the stored value at the data register as a plaintext value from a cryptographic engine.

4. The method of claim 1 further comprising controlling a timing of the copying of the leakage value such that bit transitions of the at least one of the copy registers occurs contemporaneously with a transfer of a sensitive value of a cryptographic algorithm.

5. The method of claim 1 further comprising disabling a subset of the plurality of copy registers to modify a leakage strength of the observable characteristic.

6. The method of claim 1 further comprising initializing at least one of the copy registers to a different initial value than at least one other of the copy registers.

7. The method of claim 1 wherein initializing the plurality of copy registers comprises initializing with the respective initial values that equal the stored value last copied from the leakage value circuit.

8. The method of claim 1 further comprising modifying the respective initial values as a function of a device identification of a system comprising the side-channel leakage engine.

9. The method of claim 1 wherein initializing the plurality of copy registers comprises:

generating, at a configurator circuit, a random value; and initializing at least one copy register with the random value.

10. The method of claim 1 further comprising decoding the leakage value with a decoder to generate the respective initial values of the plurality of copy registers, wherein the leakage value circuit comprises the decoder and the respective initial values define a leakage function.

11. An apparatus comprising:

a leakage value circuit comprising a data register configured to receive a leakage value;

a plurality of copy registers, each copy register comprising a respective plurality of bits; and a configurator in communication with each copy register, the configurator configured to initialize the plurality of copy registers with a respective initial value, and to copy a respective copied value from the leakage value circuit to at least one of the copy registers, wherein the configurator, based on the plurality of copy registers, is configured to generate an observable characteristic of side-channel leakage, and the observable characteristic is proportional to a number of bit transitions of the respective plurality of bits of each of the copy registers transitioning from the respective initial value to the respective copied value.

12. The apparatus of claim 11 wherein the configurator is configured to selectively enable one or more of the plurality of copy registers.

13. The apparatus of claim 11 wherein the leakage value circuit comprises a decoder in communication with the data register, each of the plurality of copy registers and the configurator.

14. The apparatus of claim 13 wherein the decoder is configured to decode the leakage value to generate the respective initial values of the plurality of copy registers, wherein the respective initial values define a leakage function.

15. The apparatus of claim 11 wherein the configurator is configured to copy a respective copied value from the leakage value circuit contemporaneously with a transfer of a sensitive value from another apparatus.

16. A method of operation for a side-channel leakage engine comprising:

initializing one or more of a plurality of copy registers with a respective initial value;

copying a respective copied value from a leakage value circuit to at least one of the copy registers contemporaneously with a transfer of sensitive data by another circuit, wherein the leakage value circuit comprises a data register comprising a leakage value and each of the copy registers comprises a respective plurality of bits; and generating an observable characteristic of the side-channel leakage engine, wherein the observable characteristic is proportional to a number of bit transitions of the respective plurality of bits of each of the copy registers transitioning from an initial value or the respective initial value to the respective copied value.

17. The method of claim 16 wherein the side-channel leakage engine repeatedly generates the observable characteristic unsynchronized to the transfer of the sensitive data.

18. The method of claim 16 wherein the side-channel leakage engine generates the observable characteristic during a time period proximal to the transfer of the sensitive data.

19. The method of claim 16 wherein the side-channel leakage engine generates the observable characteristic sequentially following an execution of a cryptographic algorithm.

20. The method of claim 16 wherein the transfer of the sensitive data is an execution step of a cryptographic algorithm.

* * * * *